(12) United States Patent
Sun

(10) Patent No.: US 6,676,729 B2
(45) Date of Patent: Jan. 13, 2004

(54) METAL SALT REDUCTION TO FORM ALLOY NANOPARTICLES

(75) Inventor: Shouheng Sun, Millwood, NY (US)

(73) Assignee: International Business Machines Corporation, Armonk, NY (US)

(*) Notice: Subject to any disclaimer, the term of this patent is extended or adjusted under 35 U.S.C. 154(b) by 18 days.

(21) Appl. No.: 10/039,540

(22) Filed: Jan. 2, 2002

(65) Prior Publication Data

US 2003/0121364 A1 Jul. 3, 2003

(51) Int. Cl.$^7$ ................................................ B22F 9/24
(52) U.S. Cl. .............................. 75/348; 75/362; 75/371
(58) Field of Search ........................... 75/348, 362, 368, 75/369, 371

(56) References Cited

U.S. PATENT DOCUMENTS 5,759,230 A * 6/1998 Chow et al. .................. 75/362
6,254,662 B1 * 7/2001 Murray et al. ............... 75/348
2002/0194958 A1 * 12/2002 Lee et al. ..................... 75/370

* cited by examiner

Primary Examiner—George Wyszomierski
(74) Attorney, Agent, or Firm—McGinn & Gibb, PLLC; Marian Underweiser, Esq.

(57) ABSTRACT

A method for making nanoparticles via metal salt reduction comprises, first, mixing metal salts in a solvent. Second, a reducing agent is added to the solvent at a temperature in the range of 100° C. to 350° C. Third, the nanoparticles dispersion is stabilized. Fourth, the nanoparticles are precipitated from the nanoparticle dispersion. Finally, the nanoparticles are re-dispersed into the solvent. The metal salt comprises a combination of $FeCl_2$, $FeCl_3$, $Fe(OOCR)_2$, $Fe(RCOCHCOR)_3$, $CoCl_2$, $Co(OOCR)_2$, $Co(RCOCHCOR)_2$, and one of $Pt(RCOCHCOR)_2$, $PtCl_2$. The reducing agent comprises one of $MBR_3H$, $MH$, $M$ naphthalides, and polyalcohol; wherein R comprises one of H and an alkyl group, wherein M comprises one of Li, Na, and K. Long chain alkyl diols, and alkyl alcohol, can be used as a co-surfactant or a co-reducing agent to facilitate nanoparticle growth and separation.

28 Claims, 3 Drawing Sheets

Bar = 18nm

Bar = 54nm

METAL SALT REDUCTION TO FORM ALLOY NANOPARTICLES

BACKGROUND OF THE INVENTION

1. Field of the Invention

The present invention generally relates to nanoparticle synthesis and assembly, and more particularly to chemical reduction of metal salts to form alloy nanoparticle materials.

2. Description of the Related Art

The CoPt and FePt binary alloy materials have long been known for their permanent magnetic applications. Recently, CoPt or FePt based nanoparticle materials have been predicted to be the next generation of ultrahigh density recording media because they are both chemically stable and magnetically hard. [D. Weller, A. Moser, *IEEE Trans. Magn.*, 35, 4423 (1999)]. The megnetocrystalline anisotropy (Ku), a term measuring the hardness to flip the magnetization of a single magnetic domain, can reach to the order of $10^8$ erg/cm$^3$. Compared to $10^6$ erg/cm$^3$ for current cobalt-based recording media, this high Ku indicates that the particles can be reduced to about 2.8 nm but still show ferromagnetic properties needed for magnetic recording. These hard magnetic nanomaterials also find applications in magnetic bias films of magneto resistive elements, and magnetic tips for magnetic force microscopy. [S. H. Liu, *IEEE Trans. Magn.*, 35, 3989 (1999); S. H. Liu, Y. D. Yao, *J. Magn. Mag. Mater*, 190, 130 (1998)].

Various vacuum-related techniques have been developed in making high coercivity M/Pt alloy particle thin films [see, for example, U.S. Pat. No. 6,007,623; U.S. Pat. No. 5,989,728; U.S. Pat. No. 5,824,409; and U.S. Pat. No. 5,846,648], the complete disclosures of which are herein incorporated by reference. These include conventional sputtering [K. R. Coffey, M. A. Parker, J. K. Howard, IEEE Trans. Magn. 31, 2737 (1995); C. P. Luo and D. J. Sellmyer, IEEE Trans. Magn. 31, 2764 (1995); M. Watanabe and M. Homma, Jpn. J. Appl. Phys. 35, L1264 (1996); T. Suzuki, N. Honda, K. Ouchi, J. Appl. Phys. 85, 4301 (1999)]; co-sputering [M. R. Visokay and R. Sinclair, Appl. Phys. Lett. 66, 1692 (1995); N. Li and B. M. Lairson, IEEE Trans, Mag., 35, 1077 (1999)]; molecular beam epitaxy [B. M. Lairson, M. R. Visokay, R. Sinclair, B. M. Clemens, Appl. Phys. Lett. 62, 639 (1993); A. Cebollada et al., Phys. Rev. B 50, 3419 (1994); T. C. Hufnagel, M C. Kautzky, B. J. Daniels, B. M. Clemens, J. Appl. Phys. 85, 2609 (1999)]; and ultrahigh vacuum deposition [S. Mitani et al., J. Magn. Mag. Mater. 148, 163 (1995); G. Dumpich et al., J. Magn. Mag. Mater. 161, 37 (1996)], the complete disclosures of which are herein incorporated by reference.

The main problem among all of these common procedures, however, is the wide distribution of as-deposited grain size and uncontrolled agglomeration of the post-annealed magnetic grains. This uncontrolled aggregation will limit the further recording density increase, as variously sized magnetic grains will result in a dramatic noise increase of the recording signal.

Recently, solution phase chemical synthesis was developed to make M/Pt nanoparticles. It is believed that the solution can offer the important homogenous nucleation step and facilitate isotropic growth of the nuclei suspended in the solution, and will yield monodisperse magnetic nanoparticle materials. These chemically made monodisperse magnetic nanoparticles can be used as building blocks to fabricate functional devices such as ultrahigh density magnetic recording [U.S. Pat. No. 6,162,532; S. Sun, D. Weller, J. Mag. Soc. Jpn, 25, 1434 (2001)], the complete disclosures of which are herein incorporated by reference.

One method of chemical synthesis includes metal salt reduction in reverse micelles at room temperature [E. E. Carpenter, C. T. Seip, C. J. O'Connor, J. Appl. Phys., 85, 5164 (1999)], the complete disclosure of which is herein incorporated by reference. Another method of chemical synthesis includes redox transmetalation reaction in warm toluene solution [J. -I. Park, J. Cheon, J. Am. Chem. Soc., 123, 5743 (2001).]. One disadvantage of these methods is that due to the low reaction temperatures, these methods generally yield particles that are poorly crystallized and irregular in their internal structure. A third solution phase synthesis of M/Pt nanoparticles involves a combination of high temperature decomposition of metal carbonyl precursor, such as Fe(CO)$_5$, and reduction of platinum salt in the presence of surfactants [U.S. Pat. No. 6,254,662; S. Sun, C. B. Murray, D. Weller, L. Folks, A. Moser, *Science*, 287, 1989 (2000)], the complete disclosures of which are herein incorporated by reference.

However, metal carbonyl may not be an ideal starting material in certain circumstances due to its toxicity. Thus, there is a need for the production of nanoparticle materials from non-toxic metal salts. Therefore, it is necessary to have an alternate procedure that can reduce metal salts to create alloy nanoparticles with controlled particle sizes.

SUMMARY OF THE INVENTION

In view of the foregoing and other problems, disadvantages, and drawbacks of the conventional methods of producing high coercivity alloy particle thin films, the present invention has been devised, and it is an object of the present invention to provide a method for synthesizing M/Pt alloy nanoparticles, with controlled particle sizes and coercivity, by chemically reducing metal salts. In order to attain the object suggested above, there is provided, according to one aspect of the invention a process for making M/Pt nanoparticles via metal salt reduction.

Specifically, the method for making M/Pt nanoparticles via metal salt reduction comprises, first, mixing metal salts in a solvent. Second, a reducing agent is added to the solvent at a temperature in the range of 100° C. to 350° C. Third, the M/Pt nanoparticle dispersion is stabilized. Fourth, the M/Pt nanoparticles are precipitated from the M/Pt nanoparticle dispersion. Finally, fifth, the M/Pt nanoparticles are re-dispersed into the solvent. The metal salt comprises a combination of M salt and Pt salt with M salt derived from any one of FeCl$_2$, Fe(OOCCH$_3$)$_2$, Fe(CH$_3$COCHCOCH$_3$)$_3$, CoCl$_2$, Co(OOCCH$_3$)$_2$, or Co(CH$_3$COCHCOCH$_3$)$_2$, and Pt salt derived from Pt(RCOCHCOR)$_2$ (R comprises an alkyl group), and PtCl$_2$. The reducing agent comprises one of MBR$_3$H, MH, metal naphthalides, polyalcohol, such as R(OH)$_2$; wherein R comprises an alkyl group, and wherein M comprises one of Li, Na, and K. The step of stabilizing the nanoparticle dispersion further comprises utilizing a long chain carboxylic acid and amine; wherein the carboxylic acid is RCOOH and the amine is RNH$_2$, wherein R is a C$_8$ chain and greater (longer). Moreover, the solvent comprises one of aromatic ether, dialkyl ether, and trialkyl amine, wherein the aromatic ether comprises diphenylether, and the dialkyl ether comprises one of dibutyl ether and dioctylether. Additionally, the trialkyl amine comprises one of tributyl amine and trioctyl amine. The method comprises adding a co-surfactant to facilitate nanoparticle growth, wherein the co-surfactant comprises alkyl alcohols. Moreover, addition of a co-reducing agent to facilitate nanoparticle separation also occurs, wherein the co-reducing agent comprises alkyl alcohol, wherein said alkyl alcohol comprises one of $RCHCH_2(OH)_2$ and $C_nH_{2n-1}OH$, wherein R comprises an alkyl group, and wherein n is in the range of 4 to 22.

Alternatively, the reducing agent may be added to the solvent at a temperature in a range of 50° C. to 350° C. Furthermore, the metal salt (M1/M2) may comprise a combination of $FeCl_2$, $FeCl_3$, $Fe(OOCR)_2$, $Fe(RCOCHCOR)_3$, $CoCl_2$, $Co(OOCR)_2$, $Co(RCOCHCOR)_2$, $NiCl_2$, $Ni(OOCR)_2$, $Ni(RCOCHCOR)_2$, $Pt(RCOCHCOR)_2$, $PtCl_2$, $Pd(OOCR)_2$, $Pd(RCOCHCOR)_2$, and $PdCl_2$, wherein R comprises an alkyl group.

Also, the reducing agent may comprise one of $MBR_3H$, MH, M naphthalides, $R-HN-NH_2$, RCHO and R(OH); wherein R comprises one of H and an alkyl group, and wherein M comprises one of Li, Na, and K. Moreover, the step of stabilizing the nanoparticle dispersion may comprise utilizing a long chain carboxylic acid and amine; wherein the carboxylic acid is RCOOH and the amine is $RNH_2$, wherein R is a $C_6$ chain and greater. Furthermore, the solvent may comprise one of aromatic ether, dialkyl ether, and trialkyl amine, wherein the aromatic ether may comprise phenylether, wherein the dialkyl ether may comprise dioctylether, and wherein the trialkyl amine comprises tributyl amine and trioctyl amine.

Also, a co-surfactant may be added to facilitate nanoparticle growth, wherein the co-surfactant may comprise one of alcohol and ROH, wherein R comprises an alkyl group. Moreover, the co-reducing agent may comprise alkyl alcohol, aldehyde and amine, wherein the alkyl alcohol comprises ROH, alkyl aldehyde comprises RCHO, and alkyl amine comprises $RHNNH_2$, and wherein R comprises a C-based long chain group.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

As previously mentioned, there is a need to make nanoparticles and nanocrystalline thin films with controlled particles sizes and coercivity. As such, this invention extends the decomposition/reduction chemistry by using reduction chemistry to make monodisperse M/Pt nanoparticles and nanocrystalline thin films with control over particle size (less than 10 nm) and coercivity (up to 1.5 Tesla).

This invention covers a further synthetic improvement to previous FePt nanoparticle synthesis and assembly. The present invention relates to the chemical reduction of metal salts to form M/Pt, (M=Fe, Co) alloy nanoparticle materials with control of particle size (less than 10 nm) and composition. Thermal annealing is applied to convert the internal particle structure from a chemically disordered fcc (face-centered cubic) to a chemically ordered fct (face-centered tetragonal) phase. The magnetic properties of the nanoparticle assemblies can be tuned from superparamagnetic to ferromagnetic with coercivity ranging from 0 Oe to 15,000 Oe.

The present invention utilizes the reduction of metal salts for M/Pt alloy nanomaterials formation. The reduction can be either a polyol reduction of a mixture of metal salts (such as $FeAc_2$, $CoAc_2$ and $Pt(acac)_2$, $PtCl_2$), or a hydride reduction of a mixture of metal salts (such as $CoCl_2$, $FeCl_2$, $Pt(acac)_2$) at high temperatures (150° C. to 350° C.) in a solvent such as phenyl ether, octylether and trialkyl amine, where $acac=CH_3COCHCOCH_3$.

The composition is controlled by the initial molar ratio of the reactants. The particles are protected from aggregation by a combination of a long chain carboxylic acid, RCOOH, wherein $R=C_8$ or longer; and a long chain primary amine, $RNH_2$, wherein $R=C_8$ or longer. The particles are easily dispersed in alkane, arene, and chlorinated solvent and purified by precipitation through the addition of alcohol. Deposition of the alkane solution of the alloy particles on a solid substrate such as $SiO_2$, Si, $Si_3N_4$, or glass forms a smooth particle thin film. As-synthesized M/Pt shows a single-phase chemically disordered fcc structure and is magnetically soft. Under thermal conditions in the range of 500° C. to 600° C., it undergoes long-range ordering to a chemically ordered fct structure. Moreover, the magnetic properties of the particle assemblies can be tuned from superparamagnetic to ferromagnetic with the coercivity ranging from 0 Oe to 15,000 Oe.

Figure 1:
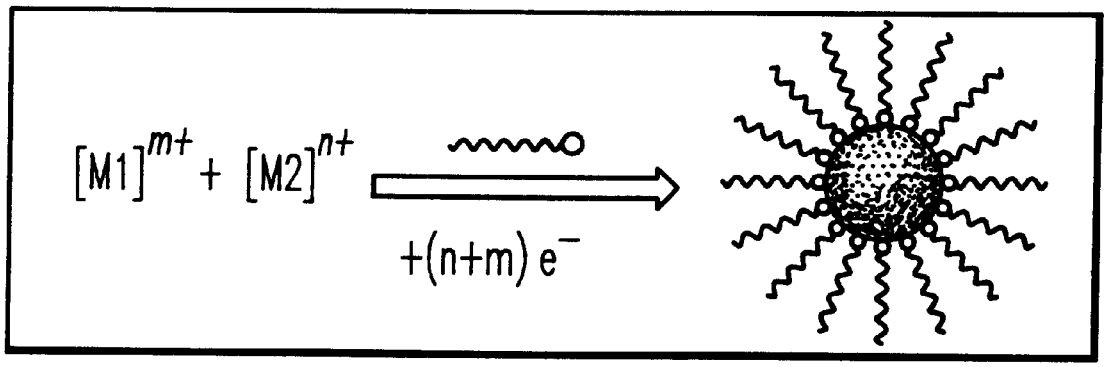
FIG. 1 is a schematic diagram of a chemical process for the preparation of M/Pt nanoparticles by metal salt reduction.

Referring now to the drawings, and more particularly to FIG. 1, there is shown a generalized scheme for the preparation of M/Pt nanoparticles via metal salt reduction according to the present invention. M1 represents metal, such as Fe, Co, Ni, Pt, Pd and m=1, or 2 or 3, while M2 represents another metal which includes the same metal as the M1 (n=m), but includes a different composition of Fe, Co, Ni, Pt, Pd for the formation of M1/M2 alloy nanoparticles. This generalized metal salt reduction is the most versatile approach to the formation of magnetic nanoparticle materials. In a solution, metal ions can be reduced by a variety of reducing agents. Reducing agents such as $MBR_3H$, where R=H, or an alkyl group, and MH, where M=Li, Na, K, can be used to reduce metal salts. The alternative family of reducing agents, such as Li, Na, K naphthalides and polyalcohol can also be used.

The reduction usually takes place instantaneously, which yields neutral metal species that further grow into magnetic nanoparticles in the presence of stabilizers. This process is illustrated in FIG. 1. The metal salts employed must be at least partially soluble in the solvent, and the reductions are carried out under an inert atmosphere, as the neutral metal species are often very air sensitive. The process according to this invention can be applied not only to M/Pt systems, but also in other binary or tertiary systems, such as NiFe, CoFe, CoNi, FePd, CoPd or FeCoPt.

According to FIG. 1, the metal salts can be of any suitable combination of the following to make CoPt or FePt or other alloy nanoparticles materials: $FeCl_2$, $FeCl_3$, $Fe(OOCR)_2$, $Fe(RCOCHCOR)_3$, $CoCl_2$, $Co(OOCR)_2$, $Co(RCOCHCOR)_2$, $NiCl_2$, $Ni(OOCR)_2$, Ni(RCOCHCOR)$_2$, Pt(RCOCHCOR)$_2$, PtCl$_2$, Pd(OOCR)$_2$, Pd(RCOCHCOR)$_2$, PdCl$_2$, wherein R=alkyl group. For example, reduction of FeCl$_2$ and Pt(CH$_3$COCHCOCH$_3$)$_2$ leads to FePt nanoparticles, and reduction of FeCl$_2$ and Pd(OOCCH$_3$)$_2$ leads to FePd nanoparticles.

Furthermore, a long chain carboxylic acid and amines are used to stabilize the M/Pt nanoparticle dispersion. A long aliphatic chain of acid and amines present a significant steric stabilization of the particles from oxidation and aggregation. The combination of acid/amine offers a good control on the M/Pt particle's growth and stabilization.

The solvent used for high temperature reduction can be either aromatic ether, such as phenylether, or dialkyl ether, such as dioctylether, or tertiary amine, such as tributyl amine and trioctyl amine. The reaction is carried out at a temperature ranging from 100° C. to 350° C. depending on the solvent used.

Long chain alkyl diols, such as 1,2-octanediol, 1,2-dodecanediol and 1,2-hexadecanediol, and alkyl alcohol, such as RCHCH$_2$(OH)$_2$ and C$_n$H$_{2n-1}$OH, where n=4 to 22, and where R comprises an alkyl group, can be used as a co-surfactant or a co-reducing agent to facilitate nanoparticle growth and separation. One example of the synthesis of FePt nanoparticle dispersion is described next.

Platinum acetylacetonate (197 mg, 0.5 mmol), FeCl$_2$.4H$_2$O (149 mg, 0.75 nmmol), 1,2-hexadecanediol 520 mg, 2 mmol) and phenyl ether (25 mL) are mixed in a glass vessel under nitrogen and heated to 100° C. Oleic acid (0.5 mmol) and oleylamine (0.5 mmol) are added and the mixture is continuously flushed with N$_2$ and heated to 200° C. A reducing agent, such as LiBEt$_3$H (1 M THF solution, 2.5 mL) is slowly dropped into the mixture. The black dispersion is stirred at 200° C. for 5 minutes under N$_2$ flushing to remove a low boiling solvent such as tetrahydrofuran (THF), and is heated to reflux at 263° C. for 20 minutes under N$_2$ atmosphere. Then, the heating source is removed and the black reaction mixture is cooled to room temperature. Ethanol is then added under ambient condition. Next, the black product is precipitated and separated by centrifugation. After which, the yellow-brown supernatant is discarded and the black product is dispersed in hexane in the presence of oleic acid and oleylamine. The product is then precipitated out by adding ethanol and centrifugation. Next, the precipitate is once again dispersed in hexane in the presence at oleic acid and oleylamine. Any unsolved precipitation is then removed by centrifugation. Finally, the particle materials Fe$_{60}$Pt$_{40}$ are precipitated out by adding ethanol and centrifugation. They can be easily re-dispersed in alkane solvent, aromatic solvent and chlorinated solvent.

Figure 2A:
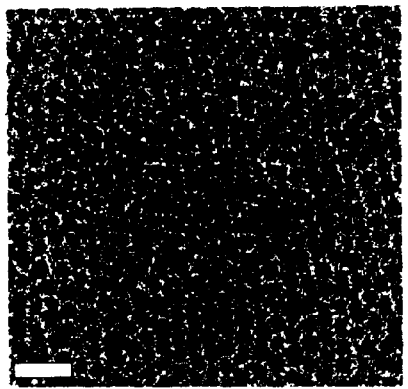
FIG. 2(a) is a transmission electron microscopy image of as-synthesized 4 nm FePt particles.
Figure 2B:
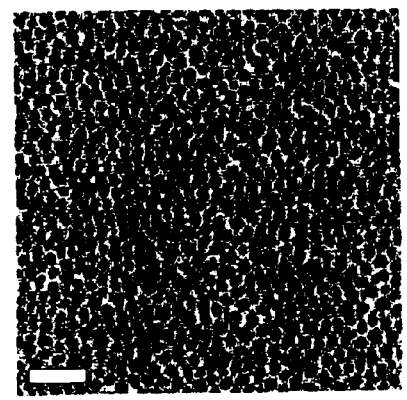
FIG. 2(b) is a transmission electron microscopy image of as-synthesized 8 nm FePt alloy particles.

FIGS. 2(a) and 2(b) illustrates two transmission electron microscopy (TEM) images of as-synthesized FePt alloy particles. Specifically, FIG. 2(a) shows 4 nm FePt nanoparticles; and FIG. 2(b) shows 8 nm FePt nanoparticles. The samples used to generate these images were deposited on a carbon-coated copper grid from their hexane dispersion. The particles are nearly monodisperse, and are well isolated from each other by a protecting group. Adding a reducing agent at a higher temperature can increase the size of the particles. For example, adding reducing agent LiBEt$_3$H (2M dioctylether solution) to a 240° C. metal-containing solution creates 8 nm FePt nanoparticle materials (FIG. (2b)). FIGS. 2(a) and 2(b) show that chemical reduction can lead to good quality nanoparticles. The particles are different from vacuum deposited FePt nanoparticles, as they are well separated.

Figure 3:
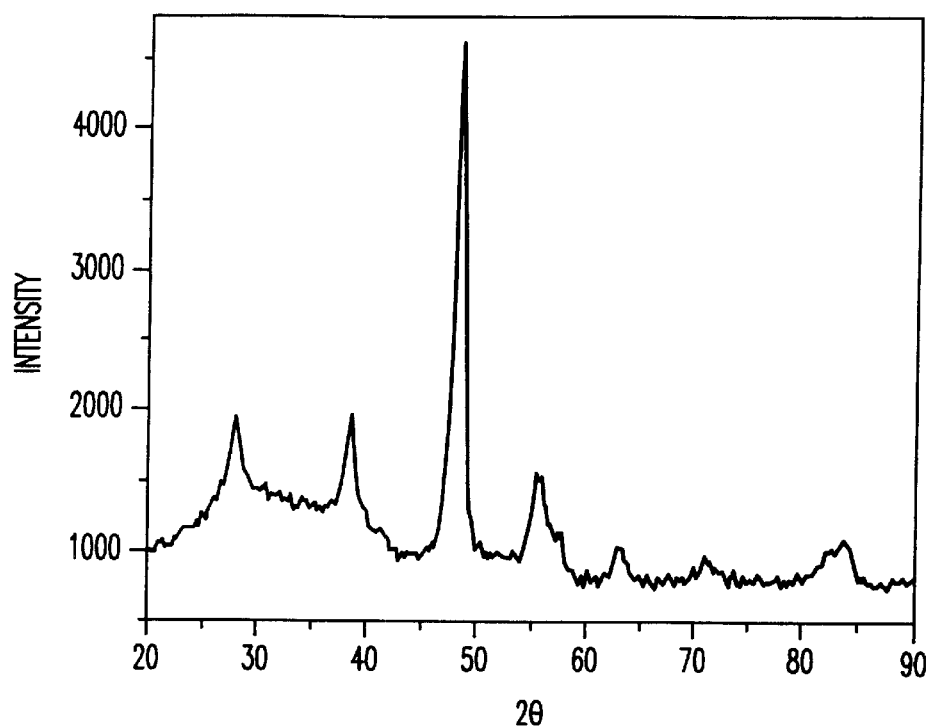
FIG. 3 is an X-ray diffraction pattern of a thermally annealed 8 nm FePt particle film.

Next, FIG. 3 depicts an X-ray diffraction pattern of an 8 nm nanoparticle film annealed at 580° C. for 30 minutes under N$_2$. The sample used to generate this pattern was deposited on a glass substrate from its hexane dispersion. The diffraction pattern was collected on a diffractometer under Co K$\alpha$ radiation ($\lambda$=1.788965 Å).

Depositing the hexane dispersion on SiO$_2$, Si, glass, and carbon substrate and drying it at room temperature leads to a well-formed particle thin film. Annealing at a temperature between 500° C. and 600° C. gives a mirror-like thin film with controlled room temperature coercivity up to 15,000 Oe. It is known that the hard magnetic behavior of the FePt alloy is related to the crystal phase transition. The as-synthesized alloy has a disordered fcc structure which transforms into an ordered fct structure after annealing. This fct crystal phase can be easily detected by X-ray diffraction of the particle assembly, as shown in FIG. 3.

The graph shown in FIG. 3 demonstrates that FePt from chemical reduction produces a high quality fct phase, which is essential for its hard magnetic properties. The graph represents the phase change from a fcc to fct structure. The x-axis represents the X-ray diffraction angle, while the y-axis represents the intensity. The spike in the graph merely represents the background noise. There is no real significance in the general downward trend in the intensity as the diffraction angle increases, other than the trend is due to the use of a glass substrate in the process.

Figure 4:
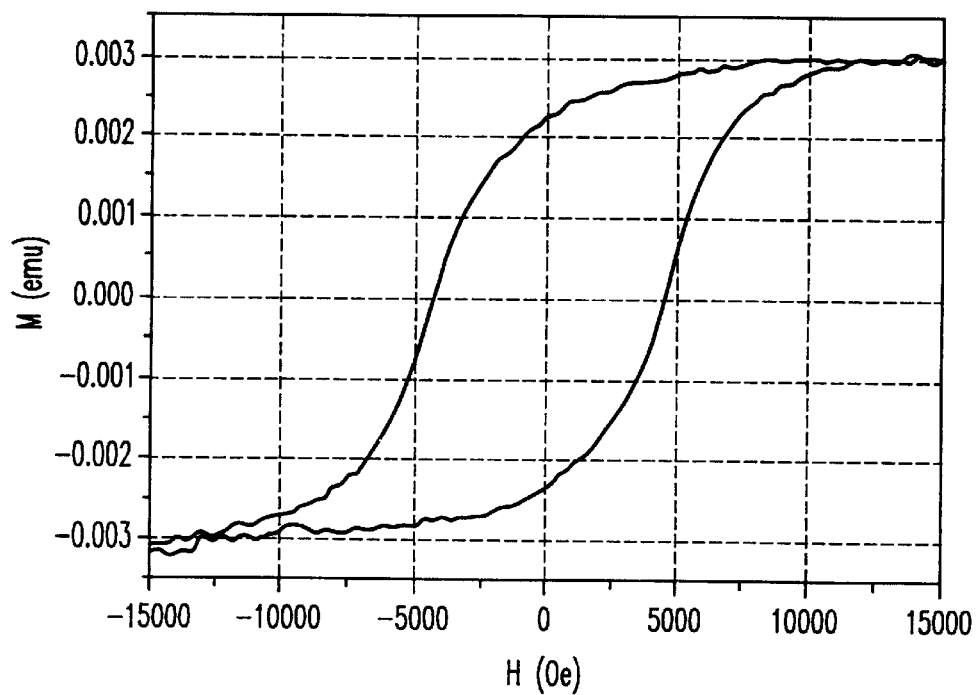
FIG. 4 is a graphical representation of a hysteresis loop of $Fe_{58}Pt_{42}$ nanoparticle materials.

Along with the structural change, magnetic properties of the assembly can be easily tuned. FIG. 4 shows a room temperature hysteresis loop of an approximately 4 nm Fe$_{58}$Pt$_{42}$ nanoparticle material annealed under Ar+H$_2$ (5%) at 510° C. for 30 minutes. The graph shows that the thermal annealing transforms the superparamagnetic fcc FePt nanoparticle assembly into a fct ferromagnetic assembly. These hard magnetic materials have many applications, such as in ultra high-density data storage and magneto-electronics. Also, these magnetic materials aid in the fabrication of highly sensitive sensors, and can also be ideal for catalytic applications.

The graph shown in FIG. 4 represents the magnetic properties of the fct phased FePt nanoparticle materials. It shows the hard magnetic properties of the annealed FePt nanoparticles. The x-axis represents the applied magnetic field, while the y-axis represents magnetization. The loop represents the particle magnetization change under an external magnetic field. The shape of the graph is significant in that it demonstrates that a strong coercive force exists in FePt nanoparticle materials. That is, the materials are magnetically hard. Conversely, if the materials are magnetically soft, then the magnetization of the materials will change with the external field rapidly, and thus, no large coercive force can be observed. The loop shows the whole particle magnetization changes with the external magnetic field from, approximately +15,000 Oe to −15,000 Oe, then back to +15,000 Oe. The two curves indicate that when the field is switched from the positive (+) to negative (−) direction, the internal particle magnetization is still pointing to the positive direction until the negative field reaches a more negative value to switch the overall magnetization to zero, and vice verse. The higher the value of this negative field, the harder the materials. The sudden increase or decrease, shown in the graph, means that the particle magnetization is switched from one direction to another. This graph is commonly known as a hysteresis loop.

Figure 5:
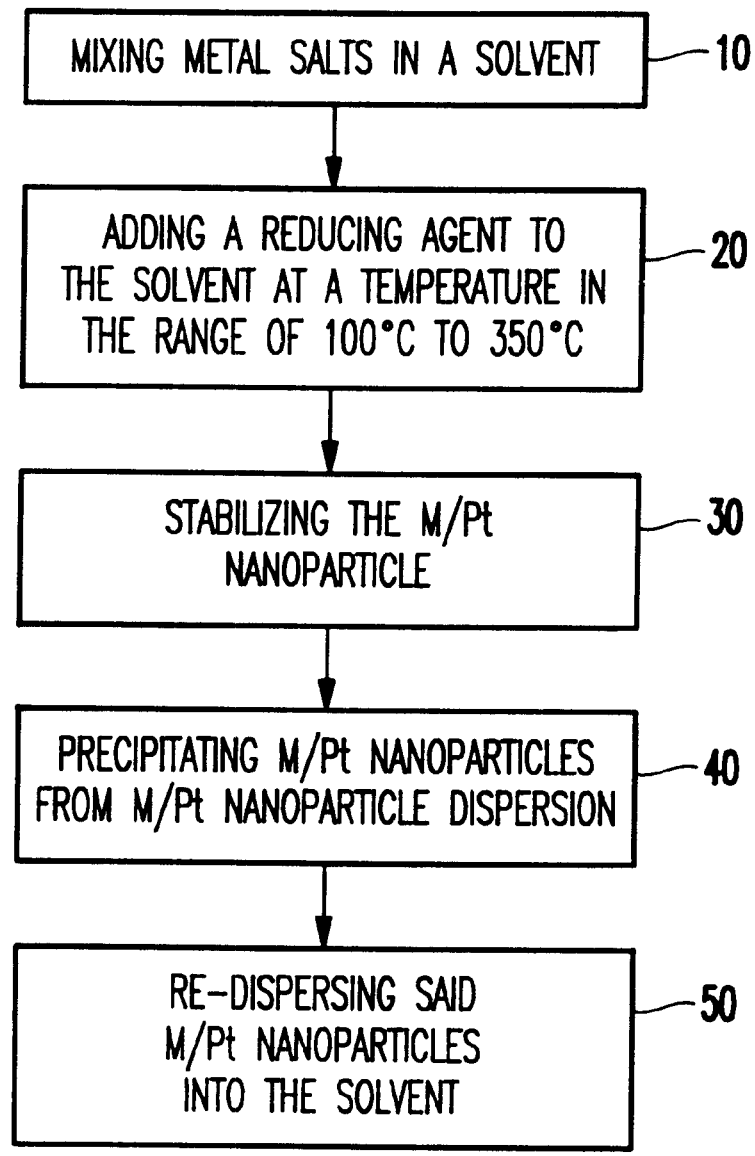
FIG. 5 is a flow diagram illustrating a preferred method of the invention.

FIG. 5 illustrates a flow diagram, which details the process of the present invention. Wherein, the method of making M/Pt nanoparticles via metal salt reduction comprises, first, mixing 10 metal salts in a solvent. Second, a reducing agent is added 20 to the solvent at a temperature in the range of 100° C. to 350° C. Third, the M/Pt nanoparticle dispersion is stabilized 30 from the M/Pt nanoparticle dispersion. Fourth, the M/Pt nanoparticles are precipitated 40. Finally, fifth, the M/Pt nanoparticles are re-dispersed 50 into the solvent. Furthermore, as previously described, M1/M2 nanoparticle processing may also be employed using the above-described method, wherein the only difference includes the composition of the materials to be used in the process.

While the invention has been described in terms of preferred embodiments, those skilled in the art will recognize that the invention can be practiced with modification within the spirit and scope of the appended claims.

What is claimed is:

1. A method of making nanoparticle materials by metal salt reduction, said method comprising:

mixing non-toxic metal salts in a solvent;

adding a reducing agent to said solvent at a predetermined temperature;

stabilizing nanoparticle dispersion;

precipitating nanoparticles from said nanoparticle dispersion; and re-dispersing said nanoparticles into said solvent, wherein said non-toxic metal salts comprises a combination of an iron salt and a platinum salt, wherein said iron salt comprises any one of $FeCl_2$, $FeCl_3$, $Fe(OOCR)_2$, $Fe(RCOCHCOR)_3$, $CoCl_2$, $Co(OOCR)_2$, $Co(RCOCHCOR)_2$, and wherein said platinum salt comprises any one of $Pt(RCOCHCOR)_2$, and $PtCl_2$, wherein R comprises an alkyl group.

2. The method of claim 1, wherein said reducing agent comprises one of $MBR_3H$, $MH$, M naphthalides, polyalcohol, and alcohols;

wherein R comprises one of H and an alkyl group, wherein M comprises one of Li, Na, and K.

3. The method of claim 1, wherein said step of stabilizing nanoparticle dispersion comprises utilizing a long chain carboxylic acid and amine; wherein said carboxylic acid is RCOOH and said amine is $RNH_2$, wherein R is a $C_8$ chain and longer.

4. The method of claim 1, wherein said solvent comprises one of aromatic ether, dialkyl ether, and trialkyl amine.

5. The method of claim 4, wherein said aromatic ether comprises diphenylether.

6. The method of claim 4, wherein said dialkyl ether comprises one of dibutyl ether and dioctylether.

7. The method of claim 4, wherein said trialkyl amine comprises one of tributyl amine and trioctyl amine.

8. The method of claim 1, wherein said predetermined temperature range is 100° C to 350 ° C.

9. The method of claim 1, further comprising adding a co-surfactant to facilitate nanoparticle growth.

10. The method of claim 9, wherein said co-surfactant comprises alkyl alcohols.

11. The method of claim 1, further comprising adding a co-reducing agent to facilitate nanoparticle separation.

12. The method of claim 11, wherein said co-reducing agent comprises alkyl alcohol, wherein said alkyl alcohol comprises one of $RCHCH_2(OH)_2$ and $C_nH_{2n-1}OH$, wherein R comprises an alkyl group, and wherein n is in the range of 4 to 22.

13. A method of reducing non-toxic metal salts into nanoparticles, said method comprising:

mixing said non-toxic metal salts in a solvent;

adding a reducing agent to said solvent at a temperature in the range of 100° C to 350° C;

stabilizing nanoparticle dispersion;

precipitating nanoparticles from said nanoparticle dispersion; and re-dispersing said nanoparticles into said solvent, wherein said non-toxic metal salts comprises a combination of an iron salt and a platinum salt, wherein said iron salt comprises any one of $FeCl_2$, $FeCl_3$, $Fe(OOCR)_2$, $Fe(RCOCHCOR)_3$, $CoCl_2$, $Co(OOCR)_2$, $Co(RCOCHCOR)_2$, and wherein said platinum salt comprises any one of $Pt(RCOCHCOR)_2$ and $PtCl_2$, wherein R comprises an alkyl group.

14. The method of claim 13, wherein said reducing agent comprises one of $MBR_3H$, $MH$, M naphthalides, and alkyl alcohols;

wherein R comprises one of H and an alkyl group, wherein M comprises one of Li, Na, and K.

15. The method of claim 13, wherein said step of stabilizing nanoparticle dispersion comprises utilizing a long chain carboxylic acid and amine; wherein said carboxylic acid is RCOOH and said amine is $RNH_2$, wherein R is a $C_8$ chain and longer.

16. The method of claim 13, wherein said solvent comprises one of aromatic ether, dialkyl ether, and trialkyl amine, wherein said aromatic ether comprises phenylether, wherein said dialkyl ether comprises dioctylether, and wherein said trialkyl amine comprises tributyl amine and trioctyl amine.

17. The method of claim 13, further comprising adding a co-surfactant to facilitate nanoparticle growth.

18. The method of claim 17, wherein said co-surfactant comprises one of alkyl alcohols and ROH, wherein said R comprises an alkyl group.

19. The method of claim 13, further comprising adding a co-reducing agent to facilitate nanoparticle separation.

20. The method of claim 19, wherein said co-reducing agent comprises alkyl alcohol, wherein said alkyl alcohol comprises one of $RCHCH_2(OH)_2$ and $C_nH_{2n-1}OH$, wherein R comprises an alkyl group, and wherein n is in the range of 4 to 22.

21. A method of reducing non-toxic metal salts into nanoparticles, said method comprising:

mixing said non-toxic metal salts in a solvent;

adding a reducing agent to said solvent at a temperature in a range of 50° C to 350° C;

stabilizing nanoparticle dispersion;

precipitating nanoparticles from said nanoparticle dispersion; and re-dispersing said nanoparticles into said solvent, wherein said non-toxic metal salts comprises a combination of an iron salt and a platinum salt, wherein said iron salt comprises any one of $FeCl_2$, $FeCl_3$, $Fe(OOCR)_2$, $Fe(RCOCHCOR)_3$, $CoCl_2$, $Co(OOCR)_2$, $Co(RCOCHCOR)_2$, and wherein said platinum salt comprises any one of $Pt(RCOCHCOR)_2$ and $PtCl_2$, wherein R comprises an alkyl group.

22. The method of claim 21, wherein said reducing agent comprises one of $MBR_3H$, $MH$, M naphthalides, R—HN—$NH_2$, RCHO and R(OH);

wherein R comprises one of H and an alkyl group, wherein M comprises one of Li, Na, and K.

23. The method of claim 21, wherein said step of stabilizing nanoparticle dispersion comprises utilizing a long chain carboxylic acid and amine; wherein said carboxylic acid is RCOOH and said amine is $RNH_2$, wherein R is a $C_6$ chain and longer.

24. The method of claims 21, wherein said solvent comprises one of aromatic ether, dialkyl ether, and trialkyl amine, wherein said aromatic ether comprises phenylether, wherein said dialkyl ether comprises dioctylether, and wherein said trialkyl amine comprises tributyl amine and trioctyl amine.

25. The method of claim 21, further comprising adding a co-surfactant to facilitate nanoparticle growth.

26. The method of claim 25, wherein said co-surfactant comprises one of alcohol and ROH, wherein said R comprises an alkyl group.

27. The method of claim 21, further comprising adding a co-reducing agent to facilitate nanoparticle separation.

28. The method of claim 27, wherein said co-reducing agent comprises alkyl alcohol, aldehyde and amine, wherein said alkyl alcohol comprises ROH, alkyl aldehyde comprises RCHO, and alkyl amine comprises $RHNNH_2$, wherein R comprises a C-based long chain group.

* * * * *